United States Patent [19]

Laborde

[11] 3,745,310

[45] July 10, 1973

[54] MAGNETIC TAPE READ-OUT SYSTEM

[75] Inventor: Pierre G. Laborde, 75 Paris, France

[73] Assignee: Compagnie Internationale Pour L'Informatique, Louveciennes, France

[22] Filed: Mar. 16, 1971

[21] Appl. No.: 124,871

[30] Foreign Application Priority Data

Apr. 8, 1970 France .............................. 7012674

[52] U.S. Cl.235/16.11 D, 235/61.11 E, 340/146.1 F, 340/146.3 R, 340/174.1 B

[51] Int. Cl. .... G06k 7/08, G06f 11/02, G11b 5/58, G06k 7/14

[58] Field of Search .............. 340/146.3 K, 146.3 R, 340/149 A, 174.1 B, 146.1 F; 235/61.11 E, 61.11 R, 61.11 D, 61.7 R; 250/219 D

[56] References Cited

UNITED STATES PATENTS

| | | | |
|---|---|---|---|
| 3,553,437 | 1/1971 | Boothroyd | 235/61.11 E |
| 3,221,302 | 11/1965 | Silverberg | 235/61.11 E |
| 3,229,073 | 1/1966 | Macker | 235/61.11 E |
| 3,225,176 | 12/1965 | Jones | 235/61.7 R |
| 3,270,319 | 8/1966 | Schmid | 340/146.3 R |
| 3,293,415 | 12/1966 | Fiehl | 235/61.11 E |
| 3,560,716 | 2/1971 | White | 235/61.11 E |
| 3,230,350 | 1/1966 | Mendelson | 340/146.1 F |
| 3,332,065 | 7/1967 | Sekse | 340/146.1 F |

OTHER PUBLICATIONS

Allen, F. K. "Skew Compensator" IBM Technical Disclosure Bulletin, p. 4, Vol. I, No. 1, June 1958.

*Primary Examiner*—Maynard R. Wilbur
*Assistant Examiner*—Robert M. Kilgore
*Attorney*—Kemon, Palmer, Stewart & Estabrook

[57] ABSTRACT

Chronometric controls are provided for detecting the occurrence of predetermined conditions of appearances of significant pulses in any character read out from the magnetic tape and for so modifying therefrom the length of the assembly operation of each read out character that the effect of the dynamic skew is substantially compensated in such assemblies.

10 Claims, 3 Drawing Figures

INVENTOR

PIERRE G. LABORDE

Kemon, Palmer & Estabrook

ATTORNEYS

Patented July 10, 1973

3,745,310

2 Sheets-Sheet 2

INVENTOR

PIERRE G. LABORDE

ATTORNEYS

MAGNETIC TAPE READ-OUT SYSTEM

BRIEF SUMMARY OF THE INVENTION

The present invention is concerned with the systems for reading information from magnetic tapes carrying on a plurality of longitudinal tracks, groups of bits defining row per row as many information characters, said bits being recorded according to the known non-return-to-zero method. According to said method, one of the binary values, "1" for instance, of the binary digits is characterized by a reversal of the polarization of the magnetization in the magnetic layer of the tape; the other binary value, "0," is characterized by a lack of reversal of polarization. From the read-out heads only the bits "1" generate signals which, after appropriate treatment, are converted into significant pulses.

The present invention is more particularly concerned with the assembly of characters from such read-out pulses and even more particularly with the relation existing between such an assembly and the dispersion with respect to the time of the read-out bits, which dispersion is due to the dynamic skew, a result of the zig-zag movement of the tape with respect to the average position defined by the tape guiding means at the location of the read-out heads.

A conventional method for assembling the binary bits for reconstituting the information characters in an assembly register to which are supplied the bit pulses resulting from the read-out of the tape consists in activating from the first pulse appearing at each read-out period of the tape a member, either a pulse counter or a single-shot multivibrator, which defines from the time instant of its activation a time interval TA during which the assembly register takes for valid in the reconstitution of a single character any and all significant pulses it receives. At the final instant of this time interval TA the content of the assembly register is transferred to a temporary store register, i.e. a buffer register the content of which will be cyclically extracted for use in the appropriate circuits of the system to which such information is intended. If T represents the period of time during which character bits may appear on the tape driven to its normal speed, the above defined time interval TA cannot exceed T/2. Due to dynamic skew, the first significant pulse which activates the member defining the assembly period TA, a pulse which may exist on any one of the tracks of the tape, may appear at any time instant with respect to the beginning of the period T, either in leading or in lagging relation with said beginning time instant. One must of course place himself in the most unfavorable case: in an information character there is only one significant pulse appearing on the track which is the most late whereas, in the next information character, a significant pulse appears on the most advanced track of the tape, these relative lateness and advance resulting from the existence of dynamic skew.

An object for the invention is to ensure compensation of dynamic skew in such magnetic tape read-out systems as hereinabove defined. As obvious, dynamic skew is not a phenomenon which abruptly varies from the read-out of a character to the read-out of the next character but on the other hand, the dynamic skew varies only over periods of time affecting several tens of characters.

For such a purpose, the invention broadly provides recourse to chronometric controls of the occurrences of the significant pulses in the successive characters and in each pair of successive characters and modification of the length of the assembly period of any character according to the results of such controls.

DETAILED DESCRIPTION

Any period of assembly of a character begins, as said, at the time instant of occurrence of the first significant pulse in this character when it is read out from the tape. Read-out of characters is made at a normal recurrence of a period of time T though, as also said, such a first significant pulse may appear in leading or lagging relation with respect to the time instant of normal beginning of such a period.

Considering first a single character beginning with a significant pulse B1 which starts an assembly period: when, from an appropriate chronometric control it is detected that there exists at least one other significant pulse after a time interval $\theta_D$ from the instant of occurrence of said pulse B1, this means that the bit B1 does not come from the most lagging track of the tape but, on the other hand, it comes from a track presenting an advance or lead of at least $\theta_D$ with respect to said most lagging track of the tape at the read-out heads location. Such a condition is shown in the upper diagram of FIG. 1 wherein the pulse B1 is followed by a pulse Bi delayed by more than a time interval $\theta_D$ with respect to B1. In such a case, the assembly period initiated by B1 could be extended from T/2 up to $(T/2 + \theta_D)$ without any risk of confusing the character B1... Bi with the next character on the tape. This value $(T/2 + \theta_D)$ is that of the maximum permissible dynamic skew of the tape for accepting as correct the read-out of a character. According to the invention, it is provided to have in such a case the value of the assembly period brought to a time interval TA1 equal to $(T/2 + \theta_D/2)$ in order to preserve a safety margin against a possible occurrence of the first significant pulse of the next character with a similar time lead with respect to its normal time instant of occurrence.

When of course the result of the chronometric control is negative, no further pulse after the i.e., time interval $\theta_D$ after B1, the assembly period is maintained at its normal value T/2. T/2 is said to be "normal" according to the current practice though of course, a lower assembly period may be considered preferable in actual practice.

Figure 1:
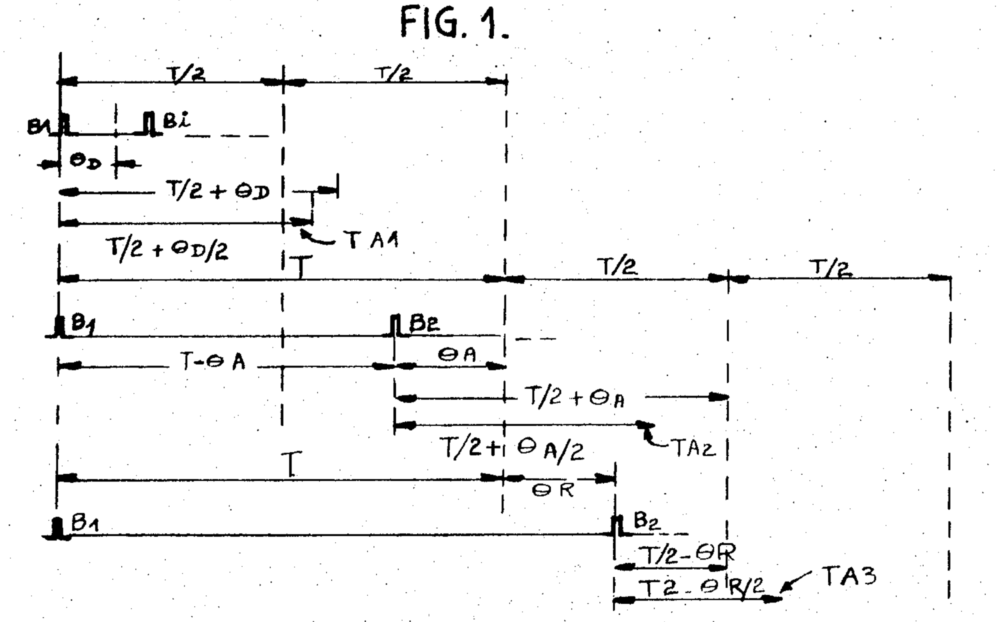
FIG. 1 shows diagrams explaining the nature and particulars of the chronometric controls to be set in a magnetic tape read-out system according to the invention for compensating dynamic skew of the tapes, at least to a substantial extent thereof.

Considering now, FIG. 1, the case when the first significant pulse B2 of the next read-out character occurs with a time lead $\theta_A$ with respect to the end of the normal period T between two successive characters read-out from the tape, the first significant pulses B1 of a character *n* and B2 of the next character *n*+1 being consequently separated by a time interval $(T - \theta_A)$, this means that, even when B1 is a bit on the most lagging track of the tape, B2 is a bit existing on that track of the tape which presents the $\theta_A$ advance or lead with respect to the other tracks of said tape. The value of permissible dynamic skew for the character $n$+1 is then (T/2 + $\theta_A$). When a chronometric control reveals such a condition, the assembly period of the character $n$+1 can be extended to (T/2 + $\theta_A$/2) in a similar fashion to the first described case, this extension preserving a safety margin against the condition when the next following character, $n$+2, would have its first significant pulse also leading by $\theta_A$ on the period T. The above remark concerning the value T/2 is also valid in this case. In the diagrams of FIG. 1, this value (T/2 + $\theta_A$/2) is referred as TA2.

There is a further case to consider, when the first significant pulse B2 of the character $n$+1 the read-out of which follows that of a character $n$ wherefor the first significant pulse is B1, occurs with a lag or delay by $\theta_R$ with respect to the period T. This condition denotes that the bit B2 is on a track of the tape lagging by $\theta_R$ with respect to the most advanced track of said tape at the read-out location. The permissible dynamic skew for the character $n$+1 in such a condition is (T/2 − $\theta_R$). The assembly period TA3 for this character $n$+1 may be provided equal to (T/2 − $\theta_R$/2) for optimization with, however, a safety margin similar to those defined for the two above defined conditions. As above too, the value T/2 may be restricted to a lower one when desired.

It must be noted that, in actual practice, the maximum value of $\theta_A$ will be at most equal to the maximum value of $\theta_R$.

Figure 2:
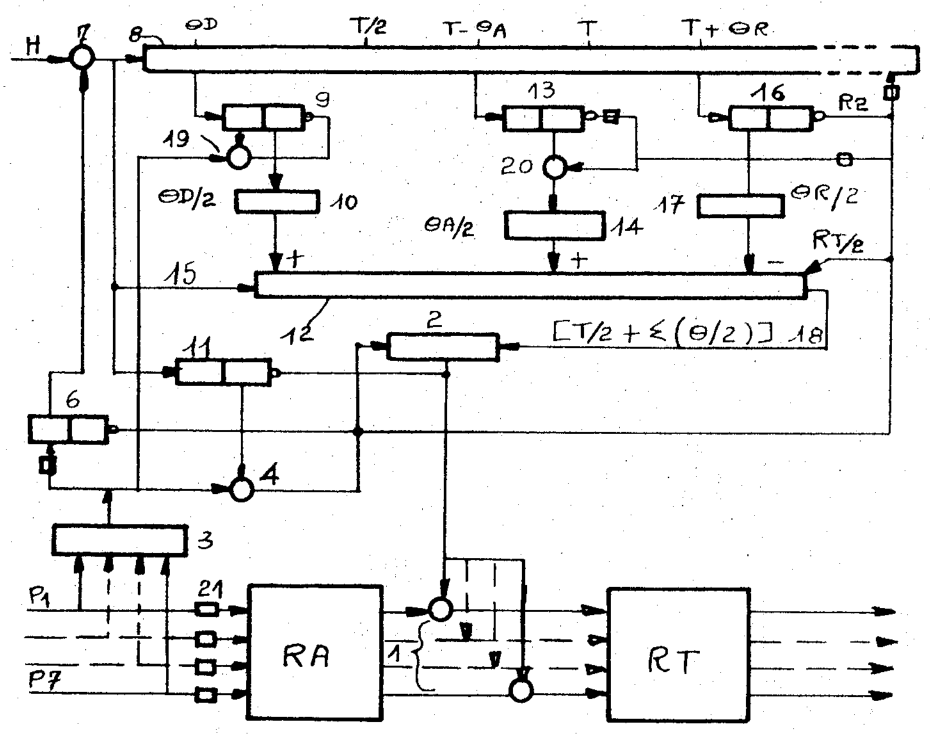
FIGS. 2 and 3 respectively show two alternative embodiments of a system according to the invention, from which may be derived any variation for the reduction to practice of the invention.
Figure 3:
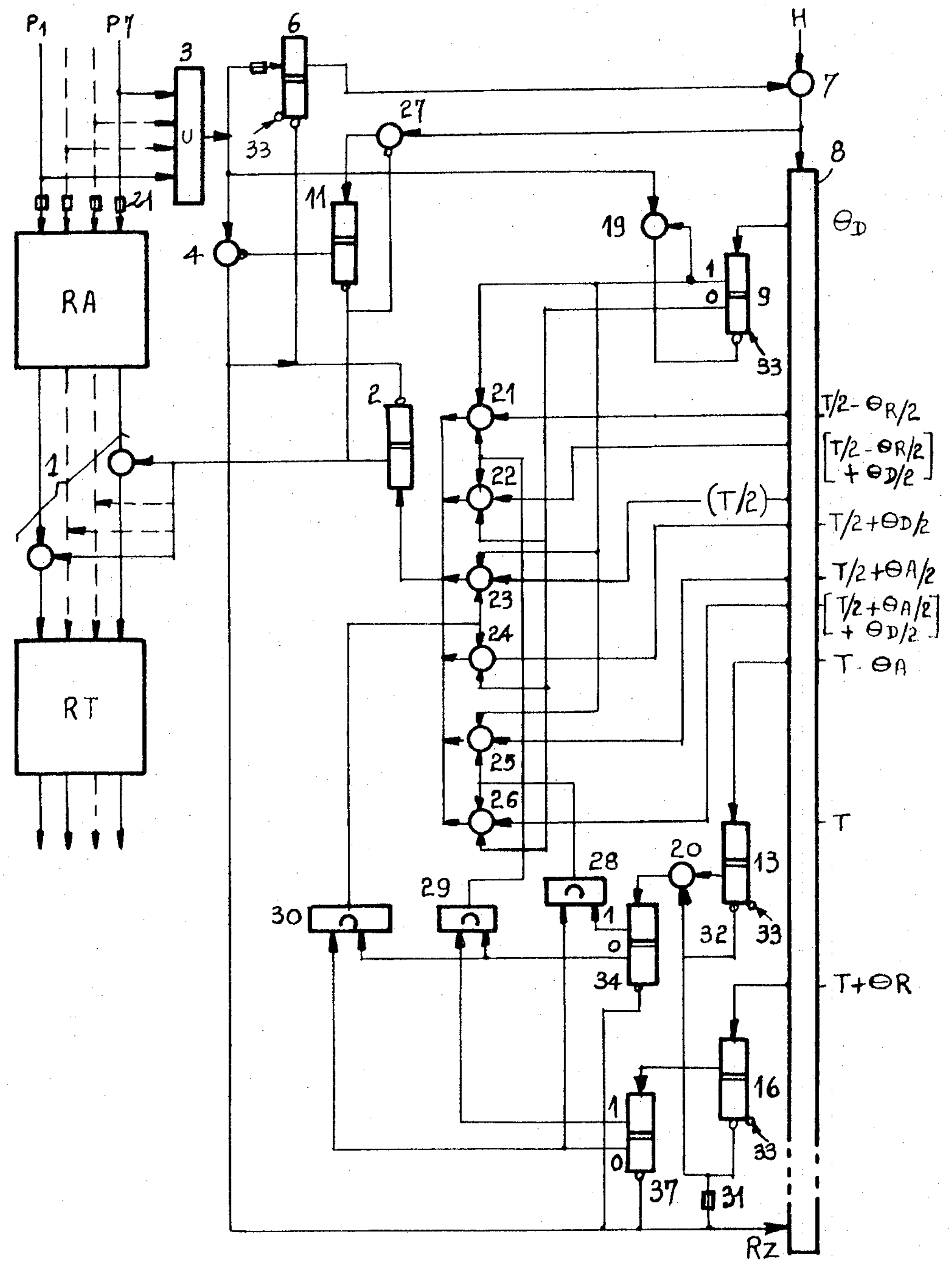

Practice of the present invention will dispose of the three above defined conditions for optimizing the assembly periods of sequantially read-out characters. Illustratively two embodiments are shown in FIGS. 2 and 3. In each of said embodiments, the tape comprises seven tracks for seven bits, P1 to P7, of the characters. The "1" representing pulses from the read-out of a character on the tape are, after a conventional derivation from the signals from the reading heads, not shown, applied with a small value delay 21 on the seven inputs of an assembly register RA the outputs of which are, through gates 1 which are only open at the end of any assembly period, to as many inputs of a buffer register RT which temporarily stores the characters for disposal in the binary data processors, not shown.

The channels P1 to P7 are connected to an OR circuit 3 the output of which is connected to the activation input of a one-digit store 6, a bistable circuit for instance. When activated, said circuit 6 unblocks a gate 7 for application of clock pulses H to the input of a pulse counter 8. The output of 3 is also applied to a gate 4 the output of which is connected to a reset input of the one-digit store 6. Said gate 4 however is blocked as soon as gate 7 is unblocked:
for instance, the first clock pulse passing through 7 controls the activation of a bistable circuit 11 which then blocks 4. This circuit 11 is reset each time it receives a signal identifying the end of an assembly period for instance from an appropriate circuit 2 set at the end of any such period. The gate 4 is then ready for accepting the next incoming pulse from the circuit 3, which will be the first significant pulse of the next read-out character from the tape. In the embodiment of FIG. 2, it is assumed that this reset on 11 is made irrespective of any possible application of a concomitant clock pulse on the activation input of 11. In FIG. 3, a further gate 27 is inserted in the lead between the output of 7 and the activation input of 11 and said gate 27 is blocked by the activation of the output of circuit 2 which resets 11.

Each time circuit 2 is activated it unblocks the gates 1 for the transfer of an assembled character from RA to RT. Said circuit 2 may consists of a bistable circuit which is reset by any pulse passing through the gate 4. It may however consist of a single-shot multivibrator which only remains activated during a fixed and predetermined time interval from the time instant it is activated.

Any pulse passing through the gate 4 is further applied to a reset input of the counter 8 as well as on other circuits which will be hereinlater defined.

Referring now specifically to FIG. 2, any pulse passing through the gate 4 is applied to an input of a pulse decounter 12 activated by the clock pulses passing through the gate 7. Said input resets the content of said decounter 12 to a value equal to T/2 (or any other predetermined "normal" value of the assembly period). This pulse decounter is settable as its pulse capacity can be modified according to the varied possibilities of automatic adjustment of the lengthes of the assemblies explained in relation to the diagrams of FIG. 1. For this purpose, the counter 8 is made with a "time" length higher than T and, for instance with a length equal to (T + T/2). Output taps are provided from said counter, which deliver signals at the times $\theta_D$, T−$\theta_A$ and T+$\theta_R$, as defined in relation with said FIG. 1, from the time instant at which the gate 7 is unblocked, i.e. from the time instant at which a first significant pulse of a character appears on one of the channels P1 to P7. Any such pulse passes through the gate 4 and resets the counter 8 to zero, casually resets the circuit 2, and blocks the gate 7 from a reset of the circuit 6. However said first significant pulse, slightly delayed, reactivates the circuit 6, hence unblocks the gate 7 for a new counting cycle of the counter 8 and inhibits the gate 4 up to a time instant after the end of an assembly period. If no further provisions were made, the assembly period would last T/2 from the time instant of activation of the counter 8 to the time instant the decounter 12 comes to zero.

For optimizing the length of the assembly periods according to the conditions which have been defined in relation to FIG. 1, the circuit arrangement of FIG. 2 includes the following provisions:

Three stores 10, 14 and 17 respectively store the values $\theta_D$/2, $\theta_A$/2 and $\theta_R$/2. When the store 10 is read-out, its output is added to the content of the decounter 12 so that the return to a zero content of said decounter is extended to a time interval T/2 + $\theta_D$/2 instead of T/2. The assembly period for such a character for which the store 10 is read-out is consequently extended by an amount equal to $\theta_D$/2. The read-out of the store 10 is obtained when a gate 19 is unblocked as a bistable member 9 has been activated from the $\theta_D$ output pulse from the counter 8 and a significant pulse still exists at the output of the OR-circuit 3. Such a pulse will pass through said gate 19, ensure the read-out of the store 10 and deactiviate the bistable member 9, consequently inhibiting a further read-out of the store 10 if a further significant pulse exists in the same character after the time interval $\theta_D$ and said Bi pulse. Such an organization of chronometric control duly meets the requirements of the first condition explained in relation to FIG. 1 and ensures a compensation of the dynamic skew by lenthening by $\theta_D$ the assembly period for any character wherefor at least one significant pulse exists, after the first one and postwards to the delay $\theta_D$. When no such further pulse exists, the store 10 is not read-out and the content of the decounter 12 is not increased by $\theta_D$.

The outputs T$-\theta_A$ and T$+\theta_R$ of the counter 8 are used for defining the intervals existing between the first significant pulses of two successive characters read out from the tape. When the first significant pulse of the second character of each successive pairoccurs between the instants T$-\theta_A$ and T$+\theta_R$ after the instant of the first significant pulse of the first character, the assembly period of the second character will be maintained at T/2 , casually extended by $\theta_D/2$ according to the previously described condition. When the first significant pulse of the second character occurs prior the instant T$-\theta_A$ after the first significant pulse of the first character, the assembly period of said second character will be lengthened by $\theta_A$/2. For providing said lengthening, the first significant pulse of any character passing through the gate 4 is applied to a gate 20 the output of which, when activated will read the content of the store 14 and add this content to that of the decounter 12, thus increasing by $\theta_A/2$ the value of said content and consequently the time interval for this decounter reaching its zero content. However, such an operation will only be permitted when said pulse from gate 4 finds the gate 20 unblocked. Said gate remains unblocked as long as no signal issues at T$-\theta_A$ from the counter 8. At the issuance of such a signal, a bistable member 13 is activated for blocking the gate 20. The bistable member 13 is reset by the pulse from the gate 4, slightly delayed with respect to its application on the gate 20. The content of the decounter 12 is consequently increased by $\theta_A$ if, and only if, the first significant pulse of the second character of any pair of successive characters occurs prior to the time instant T $-$ $\theta_A$ of the counting cycle initiated by the first significant pulse of the first character in said pair.

When conversely, the first significant pulse of the second character of any pair of successive characters occurs after the time instant T$+\theta_R$ of the counting cycle of the first character, the output signal from the tap T$+\theta_R$ of the counter 8 will read the store 17 and subtract the value $\theta_R$/2 from the content of the decounter 12 for the assembly period of the second character of said pair. The predetermination of the content of decounter 12 for this second character assembly period will consequently be T/2 $-$ $\theta_R$/2. The read-out of the store 17 occurs at the activation of the bistable member 16 from the issuance of a pulse from the output T$+\theta_R$ of the counter. No read-out occurs when the counter 8 is reset prior reaching such a position. The bistable member 16 will be reset, if activated, from the first significant pulse of the following character passing through gate 4, a pulse which, as said, also resets the counter 8 to zero, input RZ to said counter.

With such a chronometric control arrangement according to the invention, the dynamic skew is compensated for a substantial part thereof at least, because for any character the assembly period is conditioned to a corresponding one of the following values:

1. T/2 when the first significant pulse of a character occurs between the time instants T$-\theta_A$ and T$+\theta_R$ of the counting cycle of the next preceding character;

2. T/2 + $\theta_A/2$ when the first significant pulse of a character occurs prior the time instant T$-\theta_A$ of the counting cycle of the next preceding character;

3. T/2 $-$ $\theta_R/2$ when said first significant pulse of a character occurs after the time instant T$+\theta_R$ of the counting cycle of the next preceding character;

Such values are modified or not modified by a casual addition of a time interval equal to $\theta_D$/2 when a significant pulse in a character occurs after a time interval $\theta_D$ from the beginning of said counting cycle or does not occur after such a delay.

Referring now to the embodiment of FIG. 3, the decounter 12 and the stores 10, 14 and 17 of the circuitry of FIG. 2 are omitted. The end of any assembly period is defined from a logic selection between six signal pulses from taps provided on the counter 8 at the "time" lengths (T/2$-\theta_R/2$) , (T/2$-\theta_R/2+$ $\theta_D/2$), (T/2), (T/2 + $\theta_D/2$), T/2+ $\theta_A/2$) and (T/2+$\theta_A/2+\theta_D/2$), according to the six possibilities as are hereinabove enumerated/for compensation of dynamic skew. Such a logical selection is ensured in accordance with the individual conditions of bistable members 9, 13 and 16, the two latter ones being relayed by similar one-digit stores 34 and 37. The six outputs of the counter 8 are respectively applied to as many gates 21 to 26 the outputs of which are connected in a logical OR condition so that any signal passing through one of said gates during a counting cycle can reach the bistable member 2 and consequently operate the transfer of the assembled character from the assembly register RA to the buffer register RT. It must be noted that the control of the transfer gates 1 could be straightforward from the common output of the gates 21 to 26. However, it seems preferable to maintain this control through the bistable member 2 as such a bistable member is necessary for the control of the bistable member 11 and the gate 27, as previously explained.

The checking operation for decision of whether or not to lengthen the assembly period by $\theta_D$/2 is still ensured by the bistable member 9 activated from the output $\theta_D$ of the counter 8 and reset to inactivity when a significant pulse occurs after the delay $\theta_D$ on the input of the gate 19. When such a pulse exists, it simultaneously reset the bistable member 9 to zero. If not, said bistable member will be reset by the first significant pulse of the next character since the gate 19 will remain unblocked up to such an occurrence. When the bistable member 9 is not reset during a counting cycle, the assembly period must not be lengthened by $\theta_D$/2. When on the other hand, said bistable member 9 had been reset during a counting cycle after the time instant $\theta_D$ , and of course prior the time instant T/2$-\theta_R$/2, the assembling period must automatically be lengthened by the value $\theta_D$/2.

The logical conditions for unblocking the gates 21 to 26 for the issuance of the pulses marking the ends of the assembling periods may be defined as follows:

Gate 21 : $(T/2-\theta_R/2)\cdot(T+\theta_R)\cdot(T-\theta_A)\cdot\theta_D = 1$
Gate 22: $(T/2-\theta_R/2+\theta_D/2)\cdot(T+\theta_R)\cdot(T-\theta_A)\cdot\theta_D = 1$
Gate 23: $(t/2\cdot(T-\theta_A)\cdot T+\theta_R)\cdot\theta_D = 1$
Gate 24: $(T/2+\theta_D/2)\cdot(T-\theta_A)\cdot(T+\theta_R)\cdot\theta_D = 1$
Gate 25: $(T/2+\theta_A/2)\cdot(T-\theta_A)\cdot(T+\theta_R)\cdot\theta_D = 1$
Gate 26: $(T/2+\theta_A/2+\theta_D/2)\cdot(T-\theta_A)\cdot(T+\theta_R)\cdot\theta_D = 1$ .

The checking operation that the first significant pulse of the second character occurs prior to the time instant T$-\theta_A$ of the counting cycle of the first character of the concerned pair of characters is made from the bistable member 13 which is activated by the output $T-\theta_A$ of the counter 8, consequently blocking the gate 20 the output of which is connected to the "set to 1" input of a further one-digit store 34 which also may be a bistable member. The bistable member 34 is reset to zero each time a first significant pulse of a character passes through the gate 4 and, slightly delayed, this same pulse is applied to the gate 20. When the bistable member 13 has been previously set, said gate 20 has been blocked and the member 34 remains at zero: the assembly period is not to be lengthened by $\theta_A/2$. On the other hand, when the first significant pulse of a character reaches the gate 20 prior to the setting of the bistable member 13 from the output $T-\theta_A$ of the counter, the gate 20 is unblocked and this pulse sets the bistable member 34 to work for memorizing such a condition during the new counting cycle it simultaneously initiates, the assembly period being lengthened by $\theta_A/2$ for such a new counting cycle. In both cases, the bistable member 13 is reset by the first significant pulse of any character, as delayed at 31 with respect to its instants of application to 20 and 34. Actually, 13 may be reset practically simultaneously to the application of the pulse to the gate 20 as this connection 32 will inherently act with a short delay on 13.

The checking operation of the existence of such a condition as the occurrence of a first significant pulse of a character later than the instant $T+\theta_R$ in a counting cycle, is made from the condition of the bistable member 16 which is activated, or set, when the counter 8 delivers a pulse on its output $T+\theta_R$. When such a pulse occurs when the member 16 had been set, it resets said member which in turn sets a one-digit store 37, a further bistable member for instance, which had just been cleared by the same pulse as said pulse is delayed at 31 for its application to 16. When 37 is set, it indicates that the assembly period for this new character must be shortened by $\theta_R$. When 37 is not set, this means that said new assembly period must not be shortened.

The outputs 1 of member 34 and 0 of member 37 are applied to an AND-gate 28. Consequently the level of the output of 28 will be true when the logical relation $(T-\theta_A)\cdot(\overline{T+\theta_R}) = 1$ is satisfied. The output 1 of 37 and 0 of 34 are applied to an AND-gate 29. The output level of 29 will be true when the logical operation $(\overline{T-\theta_A})\cdot(T+\theta_R) = 1$ is satisfied. The 0 outputs of both 34 and 37 are applied to the AND-gate 30, the output level of which will be true when the logical relation $(\overline{T-\theta_A})\cdot(\overline{T+\theta_R}) = 1$ is satisfied.

The gate 21 receives the signals from the 1 output of the bistable member 9 and the output of the AND-gate 29. When the levels of said signals would both be true, gate 21 is unblocked and passes the signal from the tap $(T/2-\theta_R/2)$ of the counter 8 as a signal marking the end of the assembly period of the character. The gate 22 receives the signals from the 0 output of 9 and the output of the AND-gate 29. When the levels of both these signals are true, gate 22 passes the signal from the tap $(T/2-\theta_R/2+\theta_D/2)$ of the counter 8 as the signal marking the end of the assembly period of a character.

Both gates 23 and 24 receive the output signal from the AND-circuit 30. The gate 23 further receives the signal from the output 1 of the bistable member 9. When both signals are of a true level, gate 23 will consequently pass the signal from the output tap $(T/2)$ of the counter 8 as marking the end of the assembly period of the character. The gate 24 further receives the signal from the 0 output of the member 9. When both signals are of a true level, gate 24 will pass the pulse issuing from the tap $(T/2+\theta_D/2)$ of the counter as marking the end of the assembly period of a character.

The gates 25 and 26 both receive the signal issuing from the AND-gate 28. The gate 25 further receives the signal from the 1 output of the bistable member 9. When both these signals are at a true level, the signal issuing from the tap $(T/2+\theta_A/2)$ of the counter will be passed through said gate 25 for making the end of the assembly period of a character. The gate 26 further receives the signal from the 0 output of 9. When both these signals are at a true level, the gate 26 will pass the signal $(T/2+\theta_A/2+\theta_D/2)$ issuing from the counter as marking the end of the assembly period of a character.

Theoretically, the conditions $(T-\theta_A)$ and $(T+\theta_R)$ cannot coexist during a single counting cycle in 8. The just described arrangement takes into account the whole of the logical conditions in order to be foolproof against a default which could bring both members 34 and 37 to be set in a single counting cycle. However, such an arrangement can be simplified, if desired, by omitting the AND-gates 28 and 29 and directly connecting the 1 output of 34 to the gates 25 and 26, and also directly connecting the 1 output of 37 to the gates 21 and 22.

In FIG. 3, additional reset inputs have been shown at 33 for the member 6 and the members 9, 13 and 16. It is conventional to have a magnetic tape read block of characters per block of characters, each block comprising a predetermined nomber of characters. Each time a block of characters has been read from the tape, it is conventional for such an equipment to deliver a signal marking the end of such a block of characters. Such a signal will be applied to the reset inputs 33 of the members 6, 9, 13 and 16 of the dynamic skew compensation arrangement (a similar reset may be applied too to the similar components in FIG. 2) because it may occur that some of such members remain activated after the read-out of the last character of a block since there is no more "next" character to be read from the tape whereas the described checks will of course operate during the read-out of such a last character in a block. When the member 2 consists of a single-shot multivibrator, instead of a bistable member, the additional reset is not needed for the member 6.

It may be noticed that part at least of the delays which are shown as material in the drawings will probably be unnecessary as the response of the members to the action of input pulses on bistable members is inherently delayed with respect to the response of gates to such pulses.

What is claimed is:

1. In a system processing characters read out from a magnetic tape which is continuously driven at a substantially constant speed and on which such characters are spaced apart by a substantially constant distance defining a substantially constant period T of the occurrence of the read out characters, each character comprising as many bits as there are longitudinal tracks on the tape and the bit-significant pulses therefrom being stored in an assembly register provided with output gates which are unblocked by a signal marking the end of an assembly period, shorter than T, starting from the time instant of each first appearing bit-significant pulse of a pre-determined character, the combination of:

a chronometric organization activated at the beginning of each such time instant for a period the maximum duration of which exceeds the said period T and reset at each such time instant just prior to activation thereof;

first and second outputs in said organization, the first activated at a time instant ($T-\theta_A$) less than T though higher than a predetermined value TA, the second activated at a time instant ($T+\theta_R$) greater than T though lower than (T–TA);

first and second members respectively memorizing the activations of said first and second outputs within a period of activity of said organization;

first and second means reading the conditions of the said first and second members on such a time instant of each first appearing bit-significant pulse of a character prior to resetting of the said organization;

a logical operator arrangement having first and second control inputs respectively connected to the outputs of the said first and second reading means and having an output connected to unblocking inputs of the assembly register output gates and issuing, within the period of activity of said organization initiated by said first appearing bit significant pulse occurrence, an assembly period end marking signal at a time instant which is: TA in activated condition of its first control input and unactivated condition of its second control input; ($TA + \alpha\theta_A$) in unactivated condition of its first input; ($TA - \beta\theta_R$) in activated condition of its second input. $\alpha$ and $\beta$ being numerical coefficients no greater than 1.

2. Combination according to claim 1, wherein said chronometric organization includes a third output activated at a time instant $\theta_D$ lower than ($TA-\beta\theta_R$), a third member memorizing the activation of said third output within a period of activity of said organization, third reading means reading the condition of said third member at each occurrence of a bit-significant pulse and blocked after the first activated condition read-out of said third member, and in which said logical operator arrangement comprises a third control input connected to the output of said third reading means which, when activated, delays by a time interval $\gamma\theta_D$ the time instant of issuance of said assembly period end signal.

3. Combination acording to claim 1, wherein said predetermined time interval TA is substantially equal to T/2.

4. Combination according to claim 2, wherein the said $\alpha$, $\beta$ and $\gamma$ coefficients are each equal to substantially ½.

5. Combination according to claim 2, wherein in addition to said first, second and third control outputs, said chronometric organization is provided with additional pulse outputs respectively activated at the time instants ($TA - \beta\,\theta_R$), ($TA - \beta\,\theta_R + \gamma\,\theta_D$), TA, ($TA + \gamma\,\theta_D$), ($TA + \alpha\,\theta_A$), ($TA + \alpha\,\theta_A + \gamma\,\theta_D$), and wherein the said logical operator arrangement comprises as many gates the inputs of which are respectively connected to said additional pulse outputs and the outputs of which are OR-connected to the output of issuance of the said assembly period end marking signal, each of the said first, second and third reading means memorizing their respective reading results for application to their outputs within the period of activity of said organization initiated by the occurrence of the said first appearing bit-significant pulse of a character, and said outputs being selectively connected in unblocking control combinations to said gates.

6. Combination according to claim 5, wherein memorization of the results of said first and second reading means is made on members relaying the conditions of the corresponding said first and second output activation memorizing members when reset by the reading operation proper whereas the memorization of the result of the said third reading means is directly obtained on the outputs of said third activation memorizing member proper.

7. Combination according to claim 2, wherein said logical operator arrangement comprises a settable count pulse counter having its pulse count output connected to the said issuance output of the assembly period end marking signal, means feeding said pulse counter during each period of activity of the chronometric organization and means for resetting said counter to a TA count prior to activation of the said first and second reading means, a first setting modifying input increasing TA by $\alpha\,\theta_A$ when activated from the reading of the condition of the said first member, a second setting modifying input decreasing TA by $\beta\,\theta_R$ when activated from the reading of the condition of the said second member and a third setting modifying input increasing TA by $\gamma\,\theta_D$ when activated from the reading of the condition of the said third member.

8. Combination according to claim 7, wherein the said settable count pulse counter consists of a decounter activating its output at its passage by a zero count.

9. Combination according to claim 7, wherein each of the said setting modifying inputs comprises a permanent count store read on the activation of the output of the corresponding member condition reading means and having output count setting modifying connections to said pulse counter.

10. Combination according to claim 1, wherein said chronometric organization comprises a clock pulse counter, a logical OR circuit receiving all the bit-significant pulses, a first output from said OR circuit to a first gate and a second and delayed output of said OR circuit to an activation input of a two-condition member the reset input of which is connected to the output of said first gate, a second gate receiving an uninterrupted series of clock pulses and controlled to unblocking from an activated condition marking output of the said two-condition member and having an output connected to the pulse count input of said counter, means blocking said first gate on the activation of the output of the said second gate and means, connected to the output of the said logical operator arrangement, unblocking said first gate upon activation thereof, the output of said first gate being connected to the inputs of the said first and second member condition reading means and to the reset of said clock pulse counter.

* * * * *